US012289348B2

(12) United States Patent
Hale et al.

(10) Patent No.: US 12,289,348 B2
(45) Date of Patent: *Apr. 29, 2025

(54) RULES ENGINE FOR SELECTIVELY GRANTING ACCESS TO SECURED RESOURCES

(71) Applicant: Capital One Services, LLC, McLean, VA (US)

(72) Inventors: Jordan Hale, Glen Allen, VA (US); Devon Powley, Reston, VA (US); Wesley Sham, Jericho, NY (US); Thomas Shaffer, Arlington, VA (US); Jared Baker, Henrico, VA (US); John Bollinger, Richmond, VA (US); Robert Stump, Glen Allen, VA (US); Gabriel Duke, Richmond, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,872

(22) Filed: Feb. 9, 2024

(65) Prior Publication Data
US 2024/0187457 A1 Jun. 6, 2024

Related U.S. Application Data

(63) Continuation of application No. 17/195,454, filed on Mar. 8, 2021, now Pat. No. 11,909,772.

(51) Int. Cl.
*H04L 9/40* (2022.01)
*H04L 29/06* (2006.01)

(52) U.S. Cl.
CPC .......... *H04L 63/205* (2013.01); *H04L 63/105* (2013.01); *H04L 63/20* (2013.01)

(58) Field of Classification Search
CPC ....... H04L 63/105; H04L 63/20; H04L 63/10; H04L 63/102; H04L 63/104; H04L 63/101; H04L 63/108
See application file for complete search history.

(56) References Cited

U.S. PATENT DOCUMENTS 9,948,681 B1 * 4/2018 Kruse .................... H04L 63/20
10,990,689 B1    4/2021 Reiner et al.
(Continued)

OTHER PUBLICATIONS

Mcquade, Kinnaird "Salesforce Cloud Security: Automating Least Privilege in AWS IAM with Policy Sentry" (https://engineering.salesforce.com/salesforce-cloud-security-automating-least-privilege-in-aws-iam-with-policy-sentry-B04fe457b8dc) (Jan. 9, 2020).

*Primary Examiner* — Edward Zee
(74) *Attorney, Agent, or Firm* — TROUTMAN PEPPER LOCKE LLP; Christopher J. Forstner; John A. Morrissett (57) ABSTRACT

Systems and methods for providing least privilege access to a resource within a secured server are disclosed. The systems and method can include receiving an access request from a client requesting access to the resource, the access request comprising a role or policy associated with the client and one or more actions associated with the resource. A rules engine can be initialized, the engine defining one or more rules usable by the system to determine whether the access request complies with a least privilege policy. The systems and method can analyze the role or policy and the access request with the rules engine to determine whether the access request complies with the least privilege policy. When the access request complies with the rules, access to the resource can be granted; when the access request does not comply with the rules, access to the resource can be denied.

19 Claims, 7 Drawing Sheets

(56) References Cited

U.S. PATENT DOCUMENTS

| | | | | |
|---|---|---|---|---|
| 2007/0156897 A1* | 7/2007 | Lim | .................. | G06Q 10/10 |
| | | | | 709/225 |
| 2016/0344743 A1* | 11/2016 | Dotan | ................. | G06F 16/9535 |
| 2021/0136084 A1* | 5/2021 | Dayan | ..................... | H04L 63/08 |

* cited by examiner

RULES ENGINE FOR SELECTIVELY GRANTING ACCESS TO SECURED RESOURCES

CROSS-REFERENCE TO RELATED APPLICATIONS

This application is a continuation of, and claims priority under 35 U.S.C. § 120 to, U.S. patent application Ser. No. 17/195,454, filed Mar. 8, 2021, the entire contents of which are fully incorporated herein by reference.

FIELD

The present disclosure relates generally to systems and methods for selectively granting access to secured resources in a server and, more particularly, to a rules engine defining one or more rules usable to determine whether an access request complies with a least privilege policy.

BACKGROUND

Data breaches are becoming an increasingly prevalent threat to organizations that manage sensitive data, particularly in a world where much of the data is stored remotely via secured cloud servers. Although the vulnerabilities to secured servers can be numerous, one such vulnerability to secured data can be caused by providing access to resources in the cloud environment beyond the amount of access needed to complete a particular project. For example, a developer needing to access a resource associated with billing does not necessarily need access as a database administrator for user accounts, etc. Limiting access to only the required resources to complete a task, therefore, can ensure that a certain amount of partitioning is present to increase security.

This process of providing limited access can be referred to as a least privilege policy. Least privilege policies are important for companies and institutions that have strong regulatory requirements, like financial institutions, so as to ensure that a developer that needs access to secured resources only has access that corresponds to their role. Ordinarily, policy developers create Identity Access Management (IAM) policies on an as-need basis. As new resources or actions become available in a cloud management system, a database manager manually creates the new rules that correspond to the company's least privilege policy. However, this can be a daunting task for the database managers. For example, as new resources, services, actions, etc. are added to the secured server, each policy must be manually created. Further, as cloud providers add new functionalities to the system, prior policies may inadvertently provide developers access to these new functionalities, even if the developer does not need or should not have access. To date, certain attempts to lessen the burden on the database managers include templating tools that enable a user to enter an account, a resource, an action, etc., and the templating tool will write the new policy for the security personnel. However, tools to date lack the convenience of automation, improved security, and modularity of a tool that sits between the developer and the secured server.

BRIEF SUMMARY OF THE INVENTION

Examples of the present disclosure relate to rules engines defining one or more rules usable to determine whether an access request complies with a least privilege policy. The present disclosure provides a system for providing least privilege access to a resource within a secured server. The system can include one or more processors and memory storing instructions to cause the system to perform a process for providing the least privilege access to the resource. The process can include receiving an access request from a client requesting access to the resource. The access request can include a role or policy associated with the client and one or more actions associated with the resource. The process can include initializing a rules engine defining one or more rules usable by the system to determine whether the access request complies with a least privilege policy. The process can include analyzing (i) the role or policy and (ii) the access request with the rules engine to determine whether the access request complies with the least privilege policy. When the access request complies with the least privilege policy, the process can include provisioning the access request within the secured server such that the client can perform the one or more actions within the secured server. When the access request does not comply with the least privilege policy, the process can include denying access to the resource. Once denied the process can further include (i) generating a report indicating to the client which rule(s) of the one or more rules failed the least privilege policy and (ii) transmitting the report to the client.

Example rules that can be implemented by the rules engine to ensure the least privileged policies are described herein. An example rule can include a wildcard limiting rule that denies access to a resource responsive to the access request comprising a wildcard resource or a wildcard action. An example rule can include a negation limiting rule that denies access to a resource responsive to the access request comprising a negated resource or a negated action. An example rule can evaluate whether the one or more actions associated with the resource are permissible for the resource within the secured server. An example rule can include analyzing the environmental role or policy of the access request to the environmental role of the resource to see if they are different (e.g., whether the client requesting access is associated with "billing" and the resource is also associated with "billing").

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present invention in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the invention discussed herein. In similar fashion, while exemplary examples can be discussed below as device, system, or method examples, it is to be understood that such exemplary examples can be implemented in various devices, systems, and methods of the present invention.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings.

DETAILED DESCRIPTION

Examples of the present disclosure generally include systems and methods for selectively granting access to secured resources in a remote server and, more particularly, describe a rules engine defining one or more rules usable to determine whether an access request complies with a least privilege policy. The present disclosure is directed to a rules engine or rules module that sits between client developers and a secured server such that the operator of the rules module has an automatic, secure, and modular tool that overcomes the limitations of prior art systems.

The systems and methods described herein are necessarily rooted in computer technology as they relate to digital security protocols to prevent or provide access to secured servers based on client roles or policies. The rules engine described herein can limit traffic volume to a secured server to only those clients that have a legitimate development role. This access limitation can improve network performance of the system overall, while also increasing security to the sensitive data stored within the secured server. Prior least privilege policy tools provided templating engines to create developer policies for accessing a secure server. The present systems and methods, however, provide a more detailed and refined tool that accesses a developer's need to access a resource, compares the needs (or request) to pre-defined rules for accessing the resource, and grants or denies access to the resource. Further, in the case that the access request is denied, the systems and methods can inform the client how to resubmit their request so as to obtain access; in the case that the access request is granted or approved, the system can automatically provision the access request within the secured server such that the client can perform the one or more actions within the secured server.

Throughout this disclosure, reference is made to resources, actions, and access levels. These terms can be understood to mean particular tasks within a cloud computing environment, as will be appreciated. For example, a resource can be a particular Amazon® Simple Storage Service (Amazon S3) bucket usable by the client. The actions described herein can include Identity Access Management (IAM) actions available for the resource, like adding clients, deleting groups, attaching role policies, etc. Each action can also be classified by a particular access level, like "List," "Read," Write," "Permission Management," etc. An access request, as described herein, can be a request from a client, typically a developer seeking to access one or more resources to complete a defined task. As will be described in greater detail below, the present systems and methods inquire the developer or other client to specifically enumerate their request such that the rules engine can ascertain whether the access request complies with the company's least privilege policy.

Reference will now be made in detail to exemplary examples of the disclosed technology, examples of which are illustrated in the accompanying drawings and disclosed herein. Wherever convenient, the same reference numbers will be used throughout the drawings to refer to the same or like parts.

Figure 1:
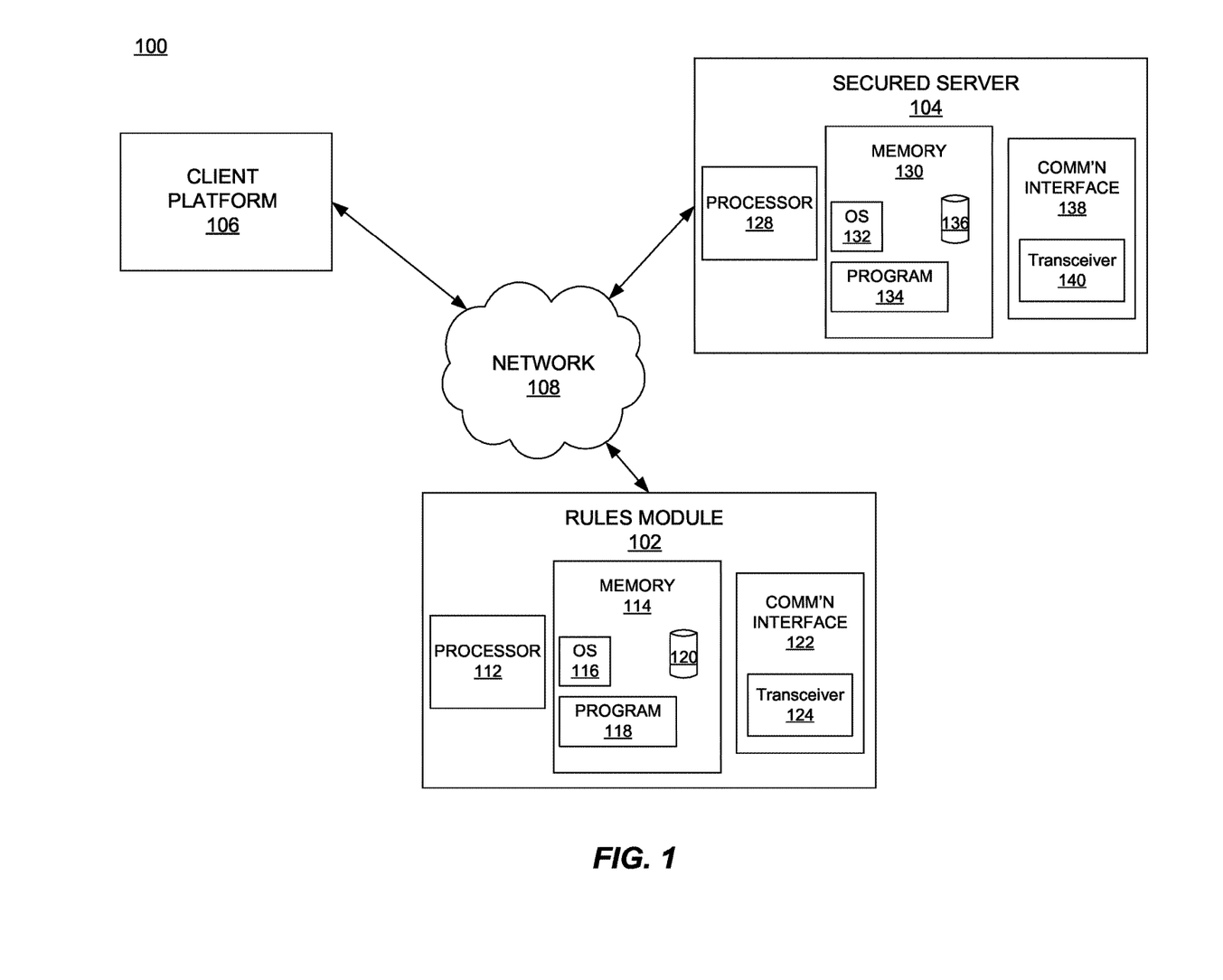
FIG. 1 is a diagram of an example system that can be used to implement one or more examples of the present disclosure.

FIG. 1 is a diagram of an example system 100 that can be used to implement one or more examples of the present disclosure. A more detailed explanation of the components of the system 100 is provided below. It is beneficial, however, to provide a brief overview to describe the components of the systems and methods for providing limited, least privilege access to secured servers. The system 100 can include a rules module 102. The rules module 102 can be associated with the entity the stores information in and uses the secured server. For example, the rules module 102 can be positioned communicatively between a secured server 104 and a client platform 106. The rules module 102 can receive an access requests from a client via the client platform 106, initialize and run a rules engine (e.g., program 118) to analyze the request, and approve or deny client access to resources within the secured server 104.

It is contemplated that the rules module 102 and the secured server 104 are associated with different entities. The rules module 102 can be associated with a company that purchases hosting services from the secured server 104, for example. As described above, in the case that the company is a highly regulated company like a financial institution, providing limited access to resources within the secured server 104 can be an imperative security measure. To this end, for companies like financial institutions, which create their own websites, applications, user interfaces, etc. and store information like account balances, private user information, etc., having a rules module 102 positioned between their clients (e.g., database managers, application architects, and the like) and the secured server 104 can create a wall of security without requiring the secured server 104 host to create the policies for the company. The rules engine can be a pluggable rules engine in that the rules associated with the least privilege policy are separate from the application source code. In this manner, the company using the rules module 102 can quickly and consistently evaluate, update, and enforce new policies as they arise. Alternatively, it is contemplated that the rules module 102 can be associated with the secured server 104. To use an example, a cloud computing host, like Amazon Web Services® ("AWS®"), can operate a rules engine and offer the engine as a service for companies wishing to explore and enforce a least privilege policy.

The rules module 102, secured server 104, and client platform 106 can communicate with each other over a wired or wireless network 108. The network 108 can, therefore, facilitate the client platform 106 accessing the resources within the secured server 104. Because the information transmitted can be personal or confidential (e.g., it can include passwords or other identifying information), the connections can also be encrypted or otherwise secured.

Figure 2:
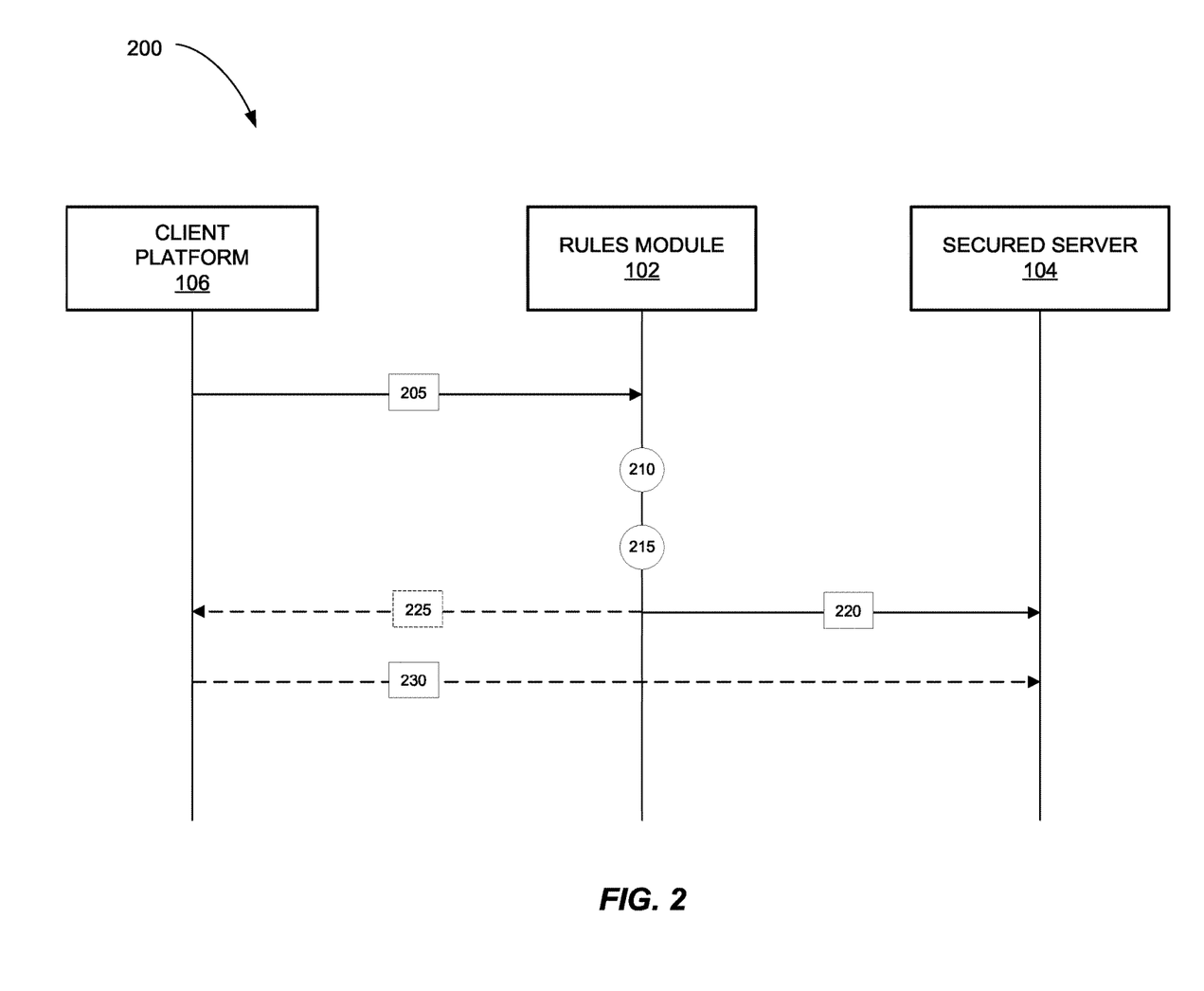
FIG. 2 is a timing diagram of an example process for providing least privilege access to a resource within a secured server, according to the present disclosure.

FIG. 2 is a timing diagram of an example process 200 for providing least privilege access to a resource within a secured server, according to the present disclosure. At step 205, the rules module 102 receives an access request from a client requesting access to a resource stored within the secured server 104. The access request can include a role or policy associated with the client (e.g., client platform 106). An IAM policy is a particular set of privileges that are associated with different IAM users or groups of users. For example, a certain list of actions can be enabled for a certain group of users in certain resources within the secured server 104. To illustrate, application developers may have "write" access within a resource that stores information related to the company's mobile application. A role can be defined as a particular set of privileges that can be used by any number of entities that need access to the particular resource. For example, all users that have access to a particular resource can have "read," but not "write," access and the like. The access request can also include a particular action that is to be performed by the client within the secured resource. For example, if the client wishes to perform some modification of or within the resource, the access request can include that particular action.

At step 210 of process 200, the rules module 102 initializes a rules engine to analyze the access request received from the client platform 106. The rules engine can define one or more rules usable by the rules module 102 to determine whether the access request complies with a least privilege policy. At step 215 of process 200, the rules module 102 can then analyze the role or policy of the access request, along with the particular action requested in the access request, to determine whether the access request complies with the least privilege policy of the rules module 102. Example rules that can be included within a least privilege policy are described in greater detail below.

After analyzing the role or policy and the action requested in light of the one or more rules of the rules engine, the process 200 can include approving the access request at step 220 or denying the access request at step 225. A denied access request can be resubmitted at step 230. In other words, the present systems and methods do not necessarily permanently block a particular client from accessing resources at the secured server, but instead can block individual access requests if they do not comply with the one or more rules.

Figure 3:
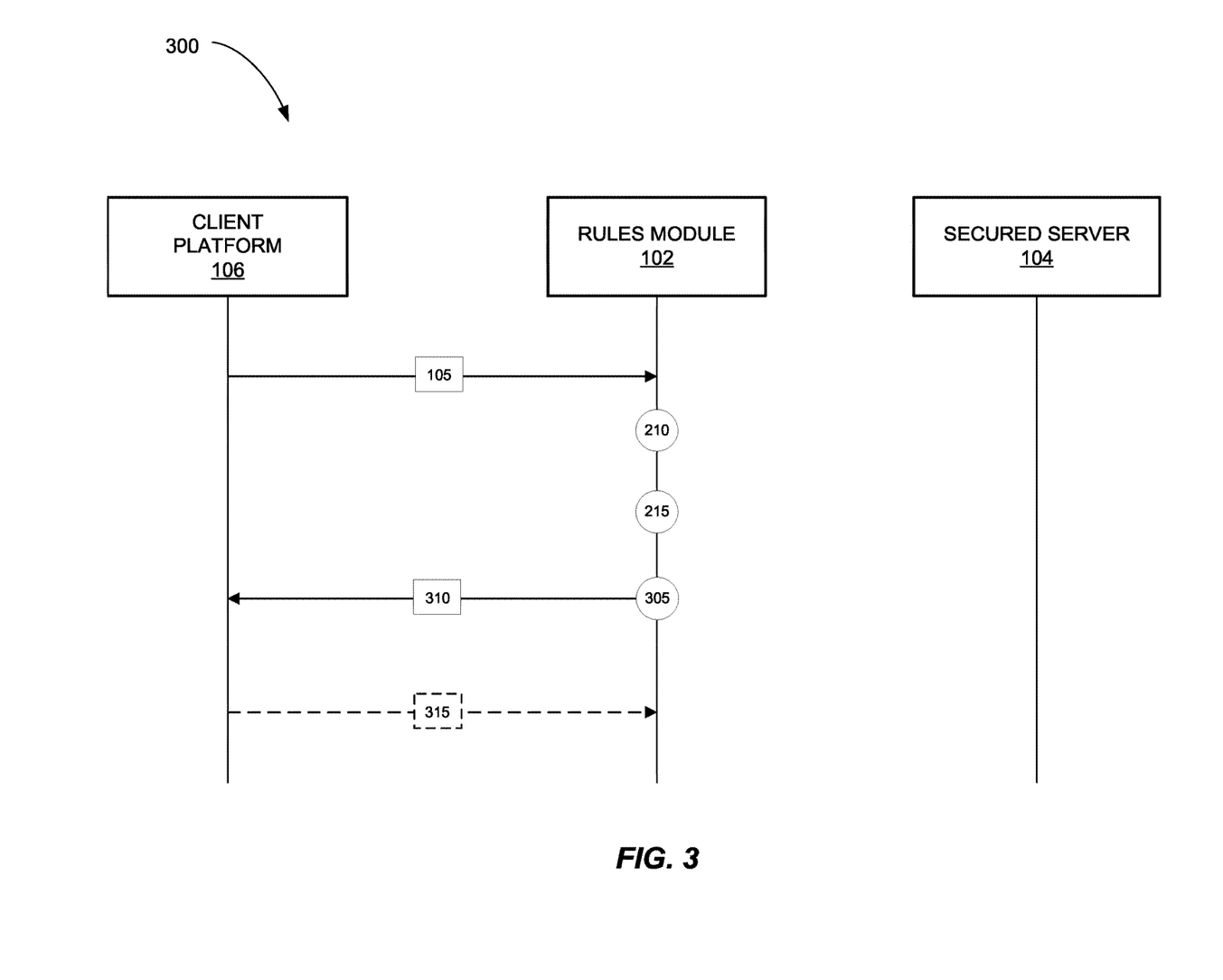
FIG. 3 is a timing diagram of an example process for notifying a client of a failed access request and resolving the failed request, according to the present disclosure.

FIG. 3 is a timing diagram of an example process 300 for notifying a client (e.g., client platform 106) of a failed access request and resolving the failed request, according to the present disclosure. After the rules module 102 determines that the access request failed to comply with one or more rules of the rules engine, the rules module 102 can generate a report to indicate which of the one or more rules were violated. Example rules are described in greater detail below, but to provide an example, one of the rules can include a prohibition against what are referred to as "wildcards," or labels for actions and/or resources that can include all respective actions and/or resources. Using syntax from AWS®, described above, to illustrate, the client may input the following statement (e.g., access request) that has an "allow effect," and the client inputs that it wishes to have access to all resources, as shown by the "*" wildcard indicator:

{"Statement": {
"Effect": "Allow",
"Action": "s3: ListBucket",
"Resource": "*"
}}

As stated above, a key aspect of least privilege polices is the ability to deny privileges to more information than needed for a client to complete its job. To resolve these over-privileged situations, like where the client includes a "wildcard," the rules module 102 can deny access to the resource and generate a report to transmit to the client platform 106 that indicates how the access request failed. At step 305, process 300 can include generating a report to include information about which of the one or more rules were violated by the access request. At step 310, process 300 can include transmitting the generated report to the client platform 106. The client can use the information in the report to reformat and resend a subsequent access request. At step 315, the rules module 102 can receive an updated access request. At this stage, process 200 as shown in FIG. 2 can be repeated with the updated access request.

Figure 4:
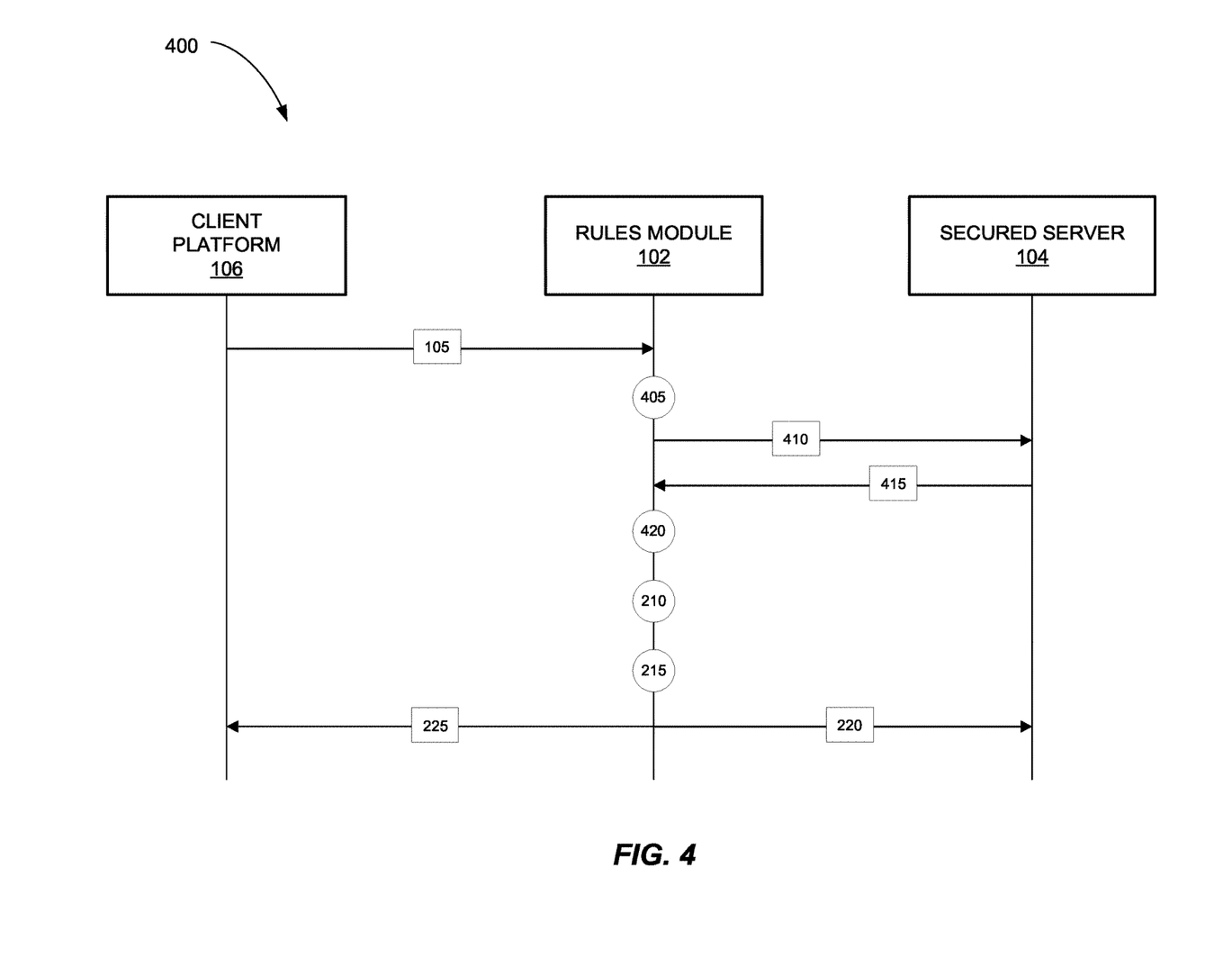
FIG. 4 is a timing diagram of an example process for determining which accounts and/or actions are available for a particular resource within the secured server, according to the present disclosure.

FIG. 4 is a timing diagram of an example process 400 determining which accounts and/or actions are available for a particular resource within the secured server 104. The process 400 shown in the timing diagram can be utilized as a pre-process step, prior to approving (step 220) or denying (step 225) the access request for the resource. At step 405, the rules module 102 can normalize the role or policy to extract an identity of the secured server, an account associated with the client, and/or a list of actions or resources approved for the client. This normalization step can be beneficial for system that enables clients (e.g., client platform 106) to transmit access requests via a variety of tools, for example a single rules module 102 that enables access requests from one or more of command line tools, programmatic Software Development Kits, custom tools such as Terraform®, etc. Once normalized, the rules module 102 can ascertain which client is requesting access, what actions are intended, and what resources are being sought.

At step 410, process 400 can include transmitting a request to the secured server 104 to fetch actions and/or accounts (e.g., clients) that are available for the requested resource. This step can identify which actions are available and which clients have privileges for those particular actions. At step 415, process 400 can include receiving the actions and/or accounts from the secured server 104. It is contemplated that, although steps 410 and 415 are shown accessing the secured server to fetch accounts and actions (e.g., from database 136), it is also contemplated that the accounts and actions can be saved separately from the secured server 104 (e.g., within a database 120 associated with the rules module 102).

Figure 5:
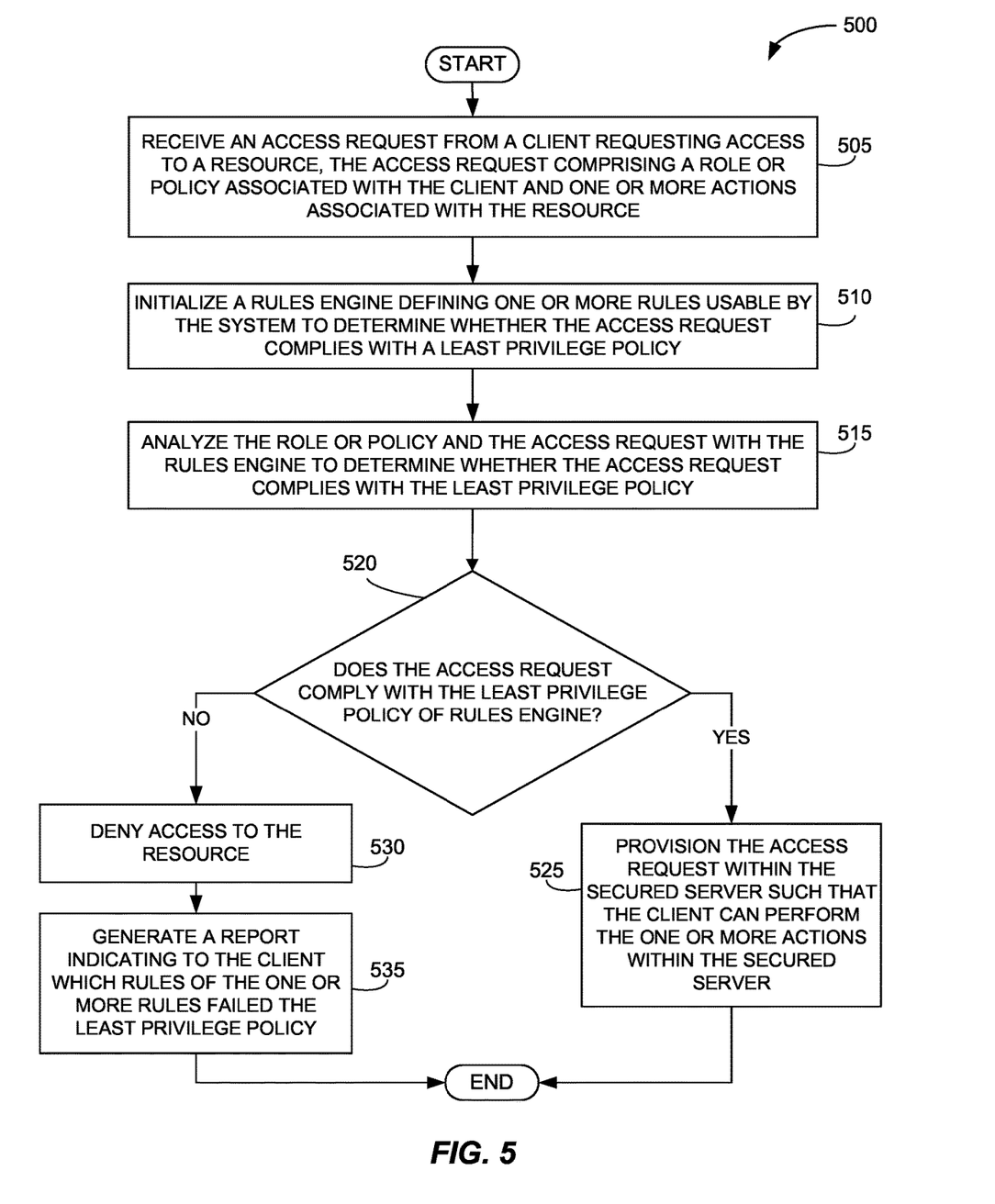
FIG. 5 is a flowchart of an example process for providing least privilege access to a resource within a secured server, according to the present disclosure.

FIG. 5 is a flowchart of an example process 500 for providing least privilege access to a resource within a secured server, according to the present disclosure. Process 500 can be performed in whole or in part by the components of the rules module 102, for example a processor 112, memory 114, and instructions (e.g., OS 116 and program 118) described below. Process 500 can begin at block 505, which includes receiving an access request from a client (e.g., from client platform 106) requesting access to a resource. The resource can be a particular database or storage unit (e.g., database 136) within the secured server 104. The access request can include a role or policy associated with the client and one or more actions associated with the resource.

At block 510, the system may initialize a rules engine defining one or more rules usable by the system (e.g., rules module 102) to determine whether the access request complies with a least privilege policy. The one or more rules can be configurable for any particular client need. Although the present disclosure does not intend to limit the types of least-privilege rules usable by the rules module 102, the following examples provide an illustration of types of rules that can be implemented.

The one or more rules within the rules module can include a wildcard limiting rule that can deny access to a resource responsive to the access request comprising a wildcard resource or a wildcard action. This example, introduced above, denies access requests that include a "wildcard" for an action or a resource. A wildcard is a term used to mean a particular call includes all data associated with that action or resource. Using the syntax identified above, the following access request could be identified as failing a wildcard limiting rule, since it seeks to have all action privileges for a particular resource:

```
{"Statement": {
    "Effect": "Allow",
    "Action": "*",
    "Resource": "arn:aws:s3:::example-bucket"
}}
```

The one or more rules within the rules module can include a negation limiting rule that can deny access to a resource responsive to the access request comprising a negation term. A negation term can be used to identify actions or resources that are "not" some other resource. For example, a potential coder could identify resources that are "not arn:aws:s3:::example-bucket," meaning all resources other than "arn:aws:s3:::example-bucket" are requested. However, this can essentially act as a "wildcard," as identified above, such that more than a specifically enumerated action or resource is included in the access request.

The one or more rules within the rules module can assess whether the one or more actions associated with the resource are permissible for the resource within the secured server. For example, certain resources (e.g., buckets) may prohibit write privileges. Using a more specific example, certain resources may prohibit certain IAM actions like "attach user policy," "delete group," etc. If the access request includes any of the resource-specific prohibited actions, the rules module can deny access to the resource. One method to determine what types of actions are permitted for certain resources is illustrated in step 405 above with reference to FIG. 4, e.g., the normalization step.

The one or more rules within the rules module can assess whether an environmental association (i.e., role association) of the client transmitting the access request is different than an environmental associate (i.e., role) of the resource. For example, some resources within the secured server 104 may be associated with user application development. Therefore, if the client transmitting the access request is associated with an environment different than user application development, the access request can be denied. One method to determine what types of actions are available for a particular client is illustrated in step 405 above with reference to FIG. 4, e.g., the normalization step. These and other rules are contemplated herein that can be useable by the rules module 102 to approve or deny access to the particular resources. At block 515, the system may analyze the role or policy and the access request with the rules engine to determine whether the access request complies with the least privilege policy (i.e., the one or more rules that define the least privilege policy).

At block 520, the system may determine whether the access request complies with the least privilege policy of the rules engine. If the access request complies, process 500 can continue to block 525, which includes provisioning the access request within the secured server such that the client can perform the one or more actions within the secured server. Provisioning can include providing an access level to the resource limited based on the role or policy associated with the client. Provisioning can also include creating an instance profile. For example, in the case of an IAM role with Amazon EC2® defined in its trust document, an instance profile can be created along with the role. If the access request does not comply with the least privilege policy of the rules engine, process 500 can proceed to block 530, which includes denying access to the resource. As stated above, denying access to the resource to perform a particular action is not necessarily permanent but instead can be resolved in a subsequent access request. To ensure the client is informed of what portion or portions of the access request were rejected by the rules engine, process 500 can continue to block 535, which includes generating a report indicating to the client which rules of the one or more rules were violated. For example, the report or notification can be transmitted to the client platform 106 with data indicating what rule was violated and how it can be resolved. Using the wildcard limitation rule above to illustrate, the report can indicate to the user that the access request included an impermissible wildcard and, to gain access to the resource, the wildcard needs to instead explicitly enumerate a role or policy associated with the client and one or more specific actions associated with specific the resource. Process 500 can end after block 525 or 535. In other examples, additional steps can be performed according to the examples described herein or other examples.

Figure 6:
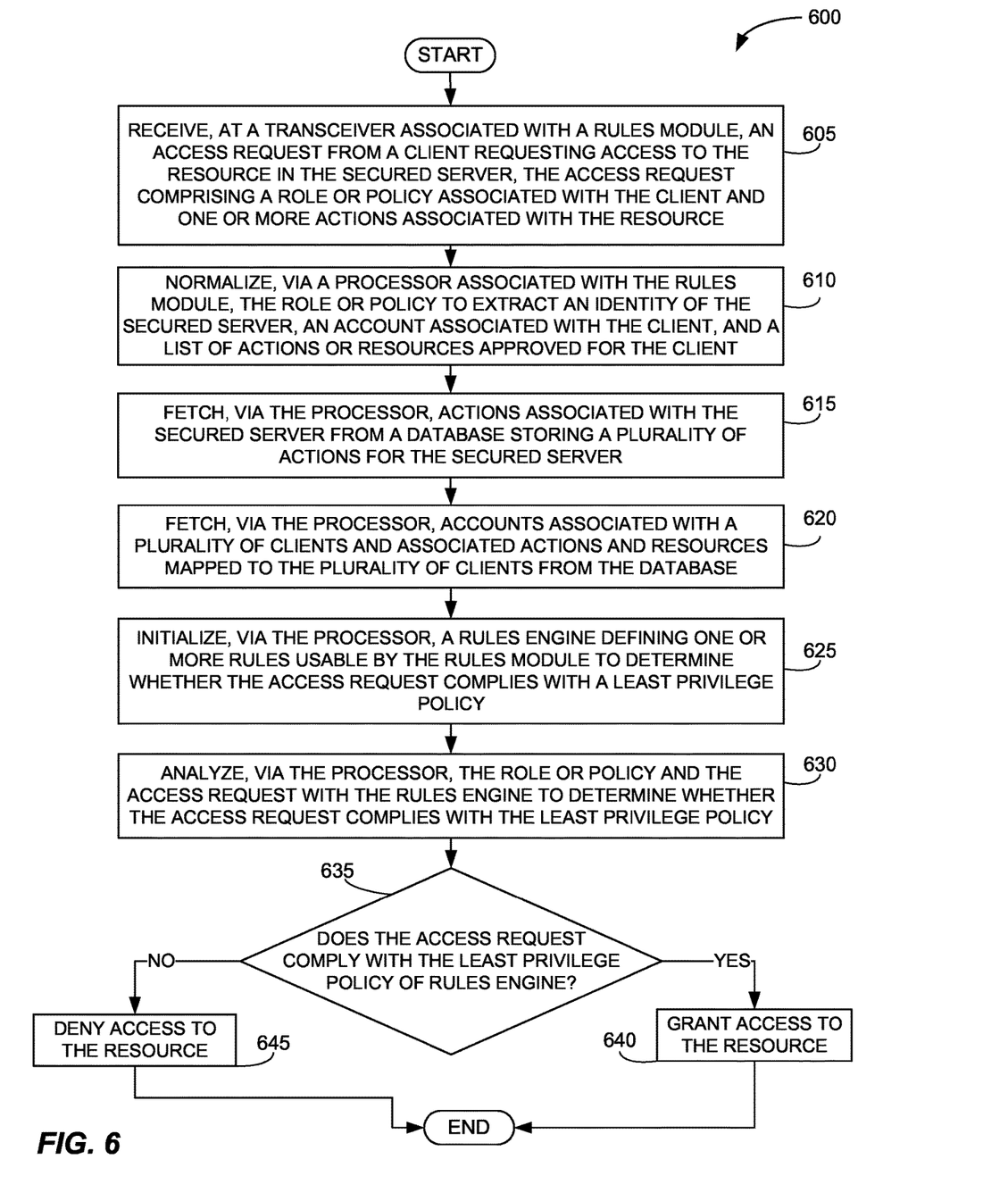
FIG. 6 is a flowchart of an example method for providing least privilege access to a resource within a secured server, according to the present disclosure.

FIG. 6 is a flowchart of an example method 600 for providing least privilege access to a resource within a secured server, according to the present disclosure. Method 600 can be performed in whole or in part by the components of the rules module 102, for example a processor 112, memory 114, instructions (e.g., OS 116 and program 118), and transceiver 124 described below. Method 600 can begin at block 605, which includes receiving, for example at the transceiver 124 associated with the rules module 102, an access request from a client (e.g., client platform 106) requesting access to the resource in a secured server (e.g., secured server 104 and/or database 136). The access request can include a role or policy associated with the client and one or more actions associated with the resource.

At block 610, the system, via one or more processors (e.g., processor 128) associated with the rules module 102, may normalize the role or policy to extract an identity of the secured server (e.g., secured server 104), an account associated with the client, and/or a list of actions or resources approved for the client. This step can be similar to the normalization step described above at step 405 with reference to FIG. 4. At block 615, the system, via the processor(s), may fetch actions associated with the secured server from a database storing a plurality of actions for the secured server. At block 620, the system, via the processor(s), may fetch accounts associated with a plurality of clients and associated actions and resources mapped to the plurality of clients from the database. The two fetching steps can be similar to the fetching steps described above in steps 410 and 415 with reference to FIG. 4.

At block 625, the system, via the processor(s), may initialize a rules engine defining one or more rules usable by the rules module to determine whether the access request complies with a least privilege policy. The one or more rules can include any of the rules described herein or as will be appreciated in accordance with a least privilege policy. At block 630, the system, via the processor(s), may analyze the role or policy and the access request with the rules engine to determine whether the access request complies with the least privilege policy. At block 635, the system may determine whether the access request complies with the least privilege policy of the rules engine. If the access request complies, method 600 can continue to block 640, which includes granting access to the resource. Block 640 can be similar to block 525 as described above with reference to FIG. 5. If the access request does not comply, method 600 can continue to block 645, which includes denying access to the resource. Block 645 can be similar to block 530 as described above with reference to FIG. 5. Further, a report can be generated informing the client how the access request failed the one or more rules, as described above with reference to block 535 in FIG. 5. Process 500 can end after block 640 or 645. In other examples, additional steps can be performed according to the examples described herein or other examples.

Figure 7:
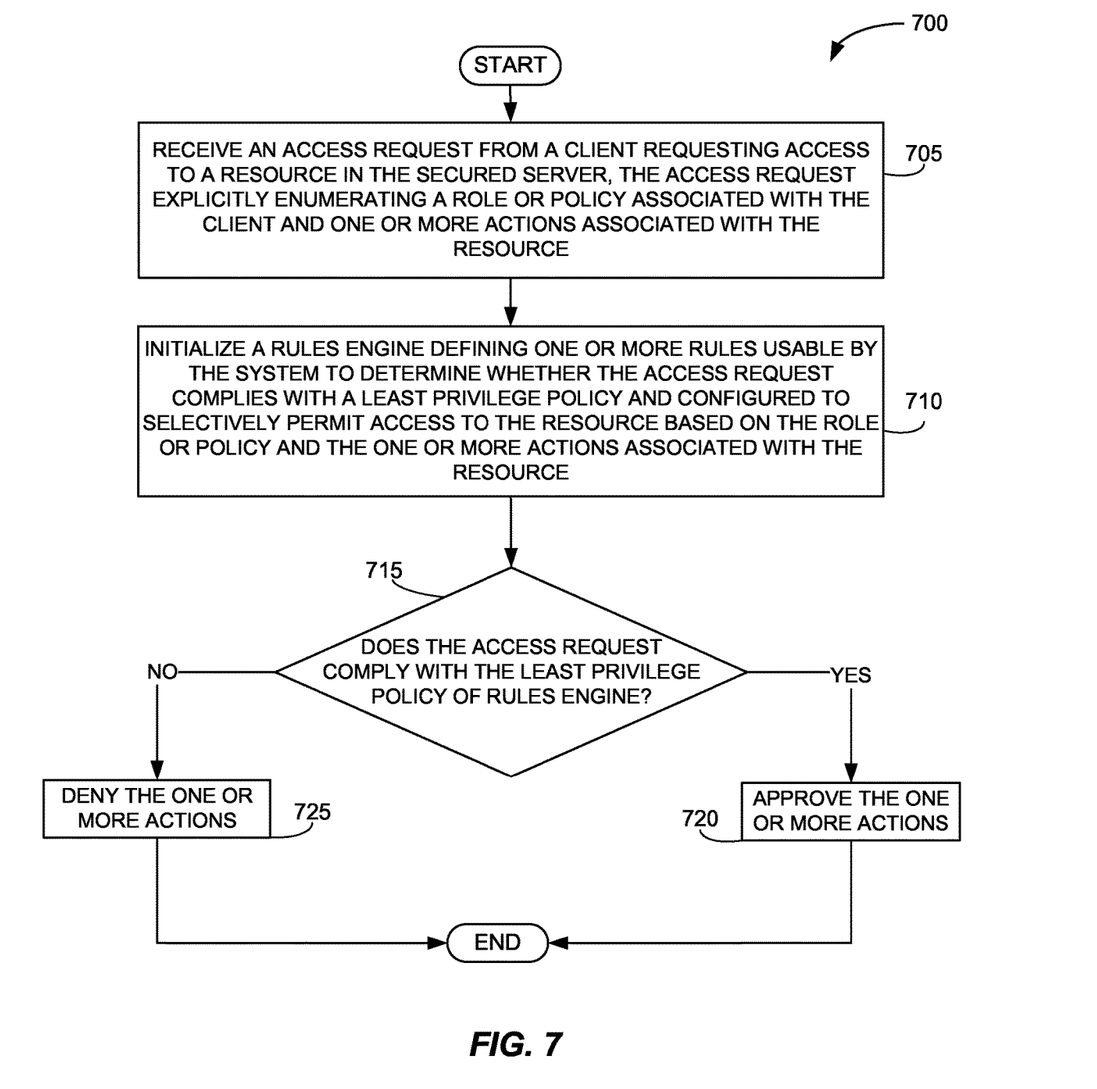
FIG. 7 is a flowchart of an example process providing least privilege access to a secured server, according to the present disclosure.

FIG. 7 is a flowchart of an example process 700 providing least privilege access to a secured server, according to the present disclosure. Process 700 can be performed in whole or in part by the components of the rules module 102, for example a processor 112, memory 114, and instructions (e.g., OS 116 and program 118) described below. Process 700 can begin at block 705, which includes receiving an access request from a client (e.g., from a client platform 106) requesting access to a resource in the secured server (e.g., secured server 104 and/or database 136). As described above, the access request should explicitly enumerate a role or policy associated with the client and one or more actions associated with the resource. Without this explicit enumeration, the rules module 102 can automatically deny the access request because, without this information, the rules module 102 may not be able to ascertain whether the access request complies with a company's least privileged policy.

At block 710, the system may initialize a rules engine defining one or more rules usable by the system (e.g., rules module 102) to determine whether the access request complies with a least privilege policy. The rules engine can selectively permit access to the resource (e.g., database 136) based on the role or policy and the one or more actions associated with the resource. If the access request complies, process 700 can continue to block 720, which includes approving the one or more actions within the access request. Block 720 can be similar to block 525 as described above with reference to FIG. 5. If the access request does not comply, process 700 can continue to block 725, which includes denying the one or more actions. Block 725 can be similar to block 530 as described above with reference to FIG. 5. Further, a report can be generated informing the client how the access request failed the one or more rules, as described above with reference to block 535 in FIG. 5. Process 700 can end after block 720 or 725. In other examples, additional steps can be performed according to the examples described herein or other examples.

Referring again to the system 100 described in FIG. 1, the rules module 102 can include one or more processors 112, a memory 114, and data storage, for example in database 120. The processor 112 can include one or more of a microprocessor, microcontroller, digital signal processor, co-processor or the like or combinations thereof capable of executing stored instructions and operating upon stored data.

The memory 114 of the rules module 102 can include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data.

The memory 114 of the rules module 102 can contain an operating system ("OS") 116 that can run one or more programs 118. The one or more programs 118 can perform one or more functions of the disclosed examples. The one or more programs 118 can include, for example, a program for comparing access requests from the client platform 106 with the one or more rules, which may be stored in database 120. The program 118 can include the rules engine that compares the rules and access requests. The rules engine can be a pluggable rules engine that is separate from the application source code for any other program associated with the company.

The memory 114 can also include any combination of one or more databases, including for example database 120, controlled by memory controller devices (e.g., server(s), etc.) or software, such as document management systems, Microsoft® SQL databases, SharePoint® databases, Oracle® databases, Sybase® databases, or other relational databases.

The rules module 102 can include a communication interface 122 for communicating with external systems or internal systems. The communication interface 122 can include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof. The communication interface 122 can include a transceiver 124 to communicate with compatible devices, for example via short range, long range (e.g., cellular, local area networks (LAN), wide area networks (WAN), etc.), or similar technologies that enables the rules module 102 to communicate via the network 110 described herein.

The secured server 104 can be a cloud computing environment. For example, the secured server 104 can be a cloud environment operated by a second entity, and the rules engine can be a separate environment operated by a first entity. The secured server 104 can include a processor 128, memory 130, operating system 132, one or more programs 134, and one or more secured databases (e.g., database 136), which can be similar to the processor 112, memory 114, operating system 116, one or more programs 118, and database 120 described above for the rules module 102, respectively. Further the secured server can include a communication interface 138 and a transceiver 140, which can be similar to the communication interface 122 and transceiver 124 described above with reference to the rules module 102, respectively.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described in this disclosure as making up various elements of the systems and methods are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Examples of the present disclosure can be implemented according to at least the following clauses:

Clause 1: A system for providing least privilege access to a resource within a secured server, the system comprising: one or more processors; and memory in communication with the one or more processors and storing instructions that, when executed by the one or more processors, are configured to cause the system to: receive an access request from a client requesting access to the resource, the access request comprising a role or policy associated with the client and one or more actions associated with the resource; initialize a rules engine defining one or more rules usable by the system to determine whether the access request complies with a least privilege policy;
   analyze the role or policy and the access request with the rules engine to determine whether the access request complies with the least privilege policy; when the access request complies with the least privilege policy, provision the access request within the secured server such that the client can perform the one or more actions within the secured server; and when the access request does not comply with the least privilege policy: deny access to the resource; generate a report indicating to the client which rules of the one or more rules failed the least privilege policy; and transmit the report to the client.

Clause 2: The system of Clause 1, wherein provisioning with the access request comprises providing an access level to the resource limited based on the role or policy associated with the client.

Clause 3: The system of Clause 1, wherein: the one or more rules comprises a wildcard limiting rule configured to deny access to a resource responsive to the access request comprising a wildcard resource or a wildcard action; and the instructions are configured to cause the system to determine that the access request does not comply with the least privilege policy when the access request comprises the wildcard resource or the wildcard action.

Clause 4: The system of Clause 1, wherein analyzing the access request with the rules engine to determine whether the access request complies with the least privilege policy comprises: evaluating whether the one or more actions associated with the resource are permissible for the resource within the secured server.

Clause 5: The system of Clause 1, wherein: the one or more rules comprises a negation limiting rule configured to deny access to a resource responsive to the access request comprising a negated resource or a negated action; and the instructions are configured to cause the system to determine that the access request does not comply with the least privilege policy when the access request comprises the negated resource or the negated action.

Clause 6: The system of Clause 1, wherein the instructions are configured to cause the system to determine that the access request does not comply with the least privilege policy when a first role association associated with the role or policy is different than a second role association associated with the resource.

Clause 7: The system of Clause 1, wherein: the system is an entity separate from the secured server; and the secured server is associated with a cloud computing network.

Clause 8: The system of Clause 1, wherein the instructions are configured to cause the system to: normalize the role or policy to extract an identity of the secured server, an account associated with the client, and a list of actions or resources approved for the client; fetch actions associated with the secured server; and fetch accounts associated with a plurality of clients and associated actions and resources mapped to the plurality of clients.

Clause 9: A method for providing least privilege access to a resource within a secured server, the method comprising: receiving, at a transceiver associated with a rules module, an access request from a client requesting access to the resource in the secured server, the access request comprising a role or policy associated with the client and one or more actions associated with the resource; normalizing, via a processor associated with the rules module, the role or policy to extract an identity of the secured server, an account associated with the client, and a list of actions or resources approved for the client; fetching, via the processor, actions associated with the secured server from a database storing a plurality of actions for the secured server; fetching, via the processor, accounts associated with a plurality of clients and associated actions and resources mapped to the plurality of clients from the database; initializing, via the processor, a rules engine defining one or more rules usable by the rules module to determine whether the access request complies with a least privilege policy; analyzing, via the processor, the role or policy and the access request with the rules engine to determine whether the access request complies with the least privilege policy; and selectively granting, via the processor, access to the secured server and resource based on the analysis of the role or policy with the rules engine.

Clause 10: The method of Clause 9, wherein selectively granting access to the secured server comprises at least one of: provisioning, via the processor and responsive to determining that the access request complies with the least privilege policy, the access request within the secured server such that the client can perform the one or more actions within the secured server; and denying, via the processor and responsive to determining that the access request does not comply with the least privilege policy, access to the resource.

Clause 11: The method of Clause 10, further comprising: generating, via the processor and responsive to denying access to the resource, a report indicating to the client which rules of the one or more rules failed the least privilege policy; and transmitting, via the transceiver, the report to the client.

Clause 12: The method of Clause 10, wherein provisioning comprises providing an access level to the resource limited based on the role or policy associated with the client.

Clause 13: The method of Clause 9, wherein: the one or more rules comprises a wildcard limiting rule configured to deny access to a resource responsive to the access request comprising a wildcard resource or a wildcard action comprising a wildcard; and the method further comprises: determining, via the processor, that the access request does not comply with the least privilege policy when the access request comprises the wildcard resource or the wildcard action; and denying, via the processor and responsive to determining that the access request does not comply with the least privilege policy, access to the resource.

Clause 14: The method of Clause 9, wherein analyzing the access request with the rules engine to determine whether the access request complies with the least privilege policy comprises: evaluating whether the one or more actions associated with the resource are permissible for the resource within the secured server.

Clause 15: The method of Clause 9, wherein: the one or more rules comprises a negation limiting rule configured to deny access to a resource responsive to the access request comprising a negated resource or a negated action; and the method further comprises: determining, via the processor, that the access request does not comply with the least privilege policy when the access request comprises the negated resource or the negated action; and denying, via the processor and responsive to determining that the access request does not comply with the least privilege policy, access to the resource.

Clause 16: The method of Clause 9, wherein: analyzing the role or policy and the access request with the rules engine to determine whether the access request complies with the least privilege policy comprises comparing a first environmental association for the role or policy and a second environmental association for the resource; and the method further comprises: determining, via the processor, that the access request does not comply with the least privilege policy when first environmental association and the second environmental association are different environments; and denying, via the processor and responsive to determining that the access request does not comply with the least privilege policy, access to the resource.

Clause 17: The method of Clause 9, wherein: the rules module is associated with an entity separate from the secured server; and the secured server is associated with a cloud computing network.

Clause 18: A system for providing least privilege access to a secured server, the system comprising: one or more processors; and memory in communication with the one or more processors and storing instructions that, when executed by the one or more processors, are configured to cause the system to: receive an access request from a client requesting access to a resource in the secured server, the access request explicitly enumerating a role or policy associated with the client and one or more actions associated with the resource; initialize a rules engine defining one or more rules usable by the system to determine whether the access request complies with a least privilege policy and configured to selectively permit access to the resource based on the role or policy and the one or more actions associated with the resource; and approve or deny the one or more actions based at least in part on a comparison of the one or more actions and the one or more rules.

Clause 19: The system of Clause 18, wherein the instructions are configured to cause the system to:
provision the access request within the secured server such that the client can perform the one or more actions within the secured server when the access request complies with the least privilege policy; and deny access to the resource, generate a report indicating to the client which rules of the one or more rules failed the least privilege policy, and transmit the report to the client when the access request does not comply with the least privilege policy.

Clause 20: The system of Clause 18, wherein the one or more rules comprises at least one of: a wildcard limiting rule configured to deny access to a resource responsive to the access request comprising a wildcard resource or a wildcard action comprising a wildcard; a first rule configured to evaluate whether the one or more actions are permissible for the resource within the secured server; a negation limiting rule configured to deny access to a resource responsive to the access request comprising a negated resource or a negated action; and a second rule configured to evaluate a first environmental association for the role or policy and a second environmental association for the resource.

EXEMPLARY USE CASES

The following exemplary use cases describe examples of a typical user flow pattern. They are intended solely for explanatory purposes and not limitation.

Jane is an application developer for National Bank. As a part of her role, she needs access as an administrator to the National Bank's Amazon Web Services® (AWS®) S3 buckets related to financial accounts. Jane uses a command line tool to input an access request, and in the access request, she indicates that she wishes to have "write" access to the resources "arn:aws:s3:::example*bucket," meaning she would have access to National Bank's S3 buckets "example1bucket," "example2bucket," and "example3bucket."

National Bank operates a rules module, a pluggable rules engine that stands between developers—like Jane—and AWS® such that the rules module can approve or deny requests to all of National Bank's secured cloud resources. After receiving Jane's request, the rules engine is initialized, and the access request is compared against rules. The rules module includes a wildcard limiting rule and, upon analyzing the "*" wildcard in Jane's access request, denies her access to the resources "arn:aws:s3:::example*bucket." By providing this real-time feedback Jane's access request, National Bank can automate its least privilege policy without having to manually create new rules. For example, as new resources (e.g., S3 buckets example7bucket, example8bucket, etc.) are added to National Bank's list of manageable resources, National Bank does not need to manually create rules that provision who can access these new resources, since the rules engine—and the wildcard limiting rule in this particular example—completes this task automatically as the new resources are added.

In the same hypothetical as above, after denying Jane's access, the rules module sends a notification to Jane indicating that the access request was denied due to the inclusion of a wildcard. The notification indicated that Jane can resubmit her access request with a more specific request. In response, Jane resubmits her access request seeking access to "arn:aws:s3:::example1bucket." However, this particular bucket is associated with the environmental role for billing database administrators. The rules module, however, found that Jane's role is not associated with billing but is instead a different environmental role. Accordingly, the rules module denies Jane's access request and sends her another notification. This time, the notification indicates that the system does not identify Jane as having proper environmental access to example1bucket. In some examples, the rules module can provide in the notification, an indication of what the system identifies as Jane's particular developer role, and the notification can indicate she must enter a resource associated with that particular developer role in order to gain access to the resource. This information can be gained by first normalizing Jane's role or policy in her access request and, after fetching accounts associated with National Bank's resources, identifying which types of environmental role(s) Jane's account is associated. Again, this rules engine provides National Bank a degree of automation not present in prior tools, such as templating tools, since National Bank needs not write new rules for each account as new resources are added within a particular developer environment. National Bank only needs to identify the environment for the resource when the new resource is added.

In the same hypothetical as the two above, Jane notices that her access request was a typographical error, and she meant to request access to "arn:aws:s3:::example2bucket." She updates her access request and resubmits it to the rules module. The rules module finds no errors in her third access request and grants write access to example2bucket." Further, the rules module further provisions her access to the particular resource, as described above.

What is claimed is:

1. A system for providing least privilege access to a resource within a secured server, the system comprising:
   one or more processors; and
   memory in communication with the one or more processors and storing instructions that, when executed by the one or more processors, are configured to cause the system to:
     receive an access request from a client requesting access to the resource, the access request comprising a role or policy associated with the client and one or more actions associated with the resource;
     initialize a rules engine defining one or more rules usable by the system to determine whether the access request complies with a least privilege policy;
     analyze the role or policy and the access request with the rules engine to determine whether the access request complies with the least privilege policy; and
     when the access request complies with the least privilege policy, provision the access request within the secured server such that the client can perform the one or more actions within the secured server,
     determine that the access request does not comply with the least privilege policy when the access request comprises a wildcard resource or a wildcard action; and
     deny access to the resource when the access request does not comply with the least privilege policy.

2. The system of claim 1, wherein, to provision the access request, the instructions cause the one or more processors to provide an access level to the resource limited based on the role or policy associated with the client.

3. The system of claim 1, wherein, to analyze the access request with the rules engine to determine whether the access request complies with the least privilege policy, the instructions cause the one or more processors to evaluate whether the one or more actions associated with the resource are permissible for the resource within the secured server.

4. The system of claim 1, wherein the instructions are configured to cause the system to:
   determine that the access request does not comply with the least privilege policy when the access request comprises a negated resource or a negated action; and
   deny access to the resource when the access request does not comply with the least privilege policy.

5. The system of claim 1, wherein the instructions are configured to cause the system to:
   determine that the access request does not comply with the least privilege policy when a first role association associated with the role or policy is different than a second role association associated with the resource; and
   deny access to the resource when the access request does not comply with the least privilege policy.

6. The system of claim 1, wherein:
   the system is an entity separate from the secured server; and
   the secured server is associated with a cloud computing network.

7. The system of claim 1, wherein the instructions are configured to cause the system to:
   normalize the role or policy to extract an identity of the secured server, an account associated with the client, and a list of actions or resources approved for the client;
   fetch actions associated with the secured server; and
   fetch accounts associated with a plurality of clients and associated actions and resources mapped to the plurality of clients.

8. A method for providing least privilege access to a resource within a secured server, the method comprising:
   receiving, at a transceiver associated with a rules module, an access request from a client requesting access to the resource in the secured server, the access request comprising a role or policy associated with the client and one or more actions associated with the resource;
   normalizing, via a processor associated with the rules module, the role or policy to extract an identity of the secured server, an account associated with the client, and a list of actions or resources approved for the client;
   initializing, via the processor, a rules engine defining one or more rules usable by the rules module to determine whether the access request complies with a least privilege policy;
   analyzing, via the processor, the role or policy and the access request with the rules engine to determine whether the access request complies with the least privilege policy;
   determining, via the processor, that the access request does not comply with the least privilege policy when the access request comprises a negated resource or a negated action; and
   denying, via the processor and responsive to determining that the access request does not comply with the least privilege policy, access to the resource.

9. The method of claim 8, wherein selectively granting access to the secured server comprises at least one of:
   provisioning, via the processor and responsive to determining that the access request complies with the least privilege policy, the access request within the secured server such that the client can perform the one or more actions within the secured server; and denying, via the processor and responsive to determining that the access request does not comply with the least privilege policy, access to the resource.

10. The method of claim 9, wherein provisioning comprises providing an access level to the resource limited based on the role or policy associated with the client.

11. The method of claim 8, further comprising:
determining, via the processor, that the access request does not comply with the least privilege policy when the access request comprises a wildcard resource or a wildcard action; and
denying, via the processor and responsive to determining that the access request does not comply with the least privilege policy, access to the resource.

12. The method of claim 8, further comprising:
evaluating whether the one or more actions associated with the resource are permissible for the resource within the secured server.

13. The method of claim 8, wherein:
analyzing the role or policy and the access request with the rules engine to determine whether the access request complies with the least privilege policy comprises comparing a first environmental association for the role or policy and a second environmental association for the resource; and
the method further comprises:
determining, via the processor, that the access request does not comply with the least privilege policy when first environmental association and the second environmental association are different environments; and
denying, via the processor and responsive to determining that the access request does not comply with the least privilege policy, access to the resource.

14. The method of claim 8, wherein:
the rules module is associated with an entity separate from the secured server; and
the secured server is associated with a cloud computing network.

15. A system for providing least privilege access to a secured server, the system comprising:
one or more processors; and
memory in communication with the one or more processors and storing instructions that, when executed by the one or more processors, are configured to cause the system to:
receive an access request from a client requesting access to a resource in the secured server, the access request explicitly enumerating a role or policy associated with the client and one or more actions associated with the resource;
initialize a rules engine defining one or more rules usable by the system to determine whether the access request complies with a least privilege policy and configured to selectively permit access to the resource based on the role or policy and the one or more actions associated with the resource;
approve or deny the one or more actions based at least in part on a comparison of the one or more actions and the one or more rules such that the instructions are configured to cause the system to provision the access request within the secured server such that the client can perform the one or more actions within the secured server when the access request complies with the least privilege policy;
normalize the role or policy to extract an identity of the secured server, an account associated with the client, and a list of actions or resources approved for the client;
fetch actions associated with the secured server; and
fetch accounts associated with a plurality of clients and associated actions and resources mapped to the plurality of clients.

16. The system of claim 15, wherein the one or more rules comprises at least one of:
a wildcard limiting rule configured to deny access to a resource responsive to the access request comprising a wildcard resource or a wildcard action comprising a wildcard;
a first rule configured to evaluate whether the one or more actions are permissible for the resource within the secured server;
a negation limiting rule configured to deny access to a resource responsive to the access request comprising a negated resource or a negated action; and
a second rule configured to evaluate a first environmental association for the role or policy and a second environmental association for the resource.

17. The system of claim 15, wherein the instructions are configured to cause the system to generate a report indicating to the client which rules of the one or more rules failed the least privilege policy when the one or more actions are denied.

18. The system of claim 15, wherein the instructions are configured to cause the system to:
determine that the access request does not comply with the least privilege policy when the access request comprises a negated resource or a negated action; and
deny access to the resource when the access request does not comply with the least privilege policy.

19. The system of claim 15, wherein the instructions are configured to cause the system to:
determine that the access request does not comply with the least privilege policy when the access request comprises a wildcard resource or a wildcard action; and
deny access to the resource when the access request does not comply with the least privilege policy.

* * * * *